United States Patent
Colagrande et al.

(10) Patent No.: US 9,906,675 B2
(45) Date of Patent: Feb. 27, 2018

(54) LINEAR IMAGE SCANNER AND SCANNING METHOD

(71) Applicants: Silvia Colagrande, Rome (IT);
Massimo Colagrande, Rome (IT);
Lorenzo Colagrande, Rome (IT)

(72) Inventors: Silvia Colagrande, Rome (IT);
Massimo Colagrande, Rome (IT);
Lorenzo Colagrande, Rome (IT)

(*) Notice: Subject to any disclaimer, the term of this patent is extended or adjusted under 35 U.S.C. 154(b) by 0 days.

(21) Appl. No.: 15/519,430

(22) PCT Filed: Oct. 21, 2015

(86) PCT No.: PCT/IB2015/058122
§ 371 (c)(1),
(2) Date: Apr. 14, 2017

(87) PCT Pub. No.: WO2016/063231
PCT Pub. Date: Apr. 28, 2016

(65) Prior Publication Data
US 2017/0230528 A1    Aug. 10, 2017

(30) Foreign Application Priority Data
Oct. 22, 2014    (IT) .............................. RM2014A0603

(51) Int. Cl.
*H04N 1/04* (2006.01)
*H04N 1/03* (2006.01)
*H04N 1/028* (2006.01)

(52) U.S. Cl.
CPC .......... *H04N 1/03* (2013.01); *H04N 1/02845* (2013.01); *H04N 1/04* (2013.01)

(58) Field of Classification Search
CPC .. H04N 9/045; H04N 1/0044; H04N 1/00968; H04N 2201/0081;
(Continued)

(56) References Cited

U.S. PATENT DOCUMENTS

| | | | | |
|---|---|---|---|---|
| 5,105,264 A | * | 4/1992 | Erhardt | H04N 5/3537 257/234 |
| 5,880,859 A | * | 3/1999 | Hiromatsu | H04N 1/486 358/514 |

(Continued)

FOREIGN PATENT DOCUMENTS

| CN | 102 798 351 A | 11/2012 |
|---|---|---|
| EP | 2 355 483 A2 | 8/2011 |
| EP | 2 387 224 A1 | 11/2011 |

OTHER PUBLICATIONS

International Search Report, dated Feb. 10, 2016, from corresponding PCT application.

*Primary Examiner* — Negussie Worku
(74) *Attorney, Agent, or Firm* — Young & Thompson

(57) ABSTRACT

A linear image scanner capable of digitizing three-dimensional surfaces according to the photometric stereo technique has a linear type imaging sensor, a scanning plane, an optical system, an optical axis, a scan line, a lighting system with at least four independently controllable light sources arranged so that each light source enlighten the scan line from a different direction. At least two first light sources are arranged symmetrically respect to the vision plane and at least two second light sources are arranged symmetrically respect to the moving plane and so that the at least two first and two second light sources radiate the scan line from at least four different directions with uniform light intensity and uniform incident angles of the light sources over the entire length of the scan line. A scanning method is also described.

20 Claims, 9 Drawing Sheets

(58) Field of Classification Search
CPC ........... H04N 2201/0084; H04N 5/335; H04N 5/3692; H04N 1/00588; H04N 9/646
USPC ..... 358/1.15, 474, 1.12, 1.14, 1.2, 2.1, 3.24, 358/406, 463, 473, 498, 518, 530
See application file for complete search history.

(56) References Cited

U.S. PATENT DOCUMENTS

| | | | | |
|---|---|---|---|---|
| 6,307,661 | B1 * | 10/2001 | Fujibayashi | ........... G02B 13/24 358/474 |
| 6,431,669 | B1 * | 8/2002 | Silverbrook | ............... B41J 2/14 347/2 |
| 6,879,341 | B1 * | 4/2005 | Silverbrook | ......... B41J 2/14314 348/207.99 |
| 7,724,402 | B2 * | 5/2010 | Ichikawa | ........... H04N 1/00795 358/474 |
| 7,758,524 | B2 * | 7/2010 | Barthe | ............... A61H 23/0245 601/2 |
| 7,780,089 | B2 * | 8/2010 | Wang | ....................... G06K 7/14 235/462.11 |
| 9,667,812 | B2 * | 5/2017 | Mukaiyama | ......... H04N 1/6044 |

* cited by examiner

LINEAR IMAGE SCANNER AND SCANNING METHOD

FIELD OF THE INVENTION

The present invention relates to a linear image and three-dimensional surface scanner based on a linear type color or greyscale imaging sensor, such as a linear, bilinear, trilinear, multilinear or similar sensor, capable of obtaining 3D information of elevation, height and embossing from the digitization of objects and three-dimensional surfaces according to the photometric stereo technique and therefore by combining the information of different images of the object all acquired from the same point of view but varying the lighting direction between the different acquisitions.

The object of digitization is a portion of the surface of a three-dimensional object such as a coin or a vase or a surface basically flat with three-dimensional details such as a painting, bas relief, textile, leather, wood panel, marble slab, stone, ceramic, wallpaper, cliché, etc.

Furthermore, the invention describes a scanning method.

STATE OF THE ART

The industrial reproduction for decorative purposes such as paintings, bas-reliefs, textile, leather, wood panels, marble slabs, stones, wallpapers, etc., requires the digitization of color information but also more and more frequently the digitization of information of elevation, height and embossing in order to copy and reproduce, with the finest details, the three-dimensional structure of the original surface. Currently art reproduction for the most different purposes, such as duplication and conservation, has similar digitization needs to the industrial reproduction for decorative purposes. In recent years, the need for obtaining also three-dimensional information has grown exponentially with the increasing popularity of 3D printing technologies. The scanning of three-dimensional surfaces and in particular obtaining information of elevation, height and embossing is nowadays achieved by various techniques depending on the format and resolution requirements. In particular, the industrial reproduction for decorative purposes requires the digitization of large surfaces, even of several square meters, with a high level of color and 3D detail often even greater than 300PPI and above all it requires the capability of recording minimal variations in the elevation, height and embossing over the surface of the original, even of a few micrometers only. With such high format and resolution requirements, the digitization of information of elevation, height and embossing is today mainly obtained using the "Point-to-Point scanning" technique as it is the only one that has so far been able to ensure achieving the required results. Point-to-Point scanning involves using a dedicated scanner to digitize the elevation, height and embossing information, a scanner that is however not able to acquire also color information. The most common implementation is based on Point-to-Point scanning achieved using a laser or confocal sensor. However, this technique involves extremely long scanning times due to the need for acquiring every point of the image individually and often it takes even a week to obtain a high resolution 3D map of a one square meter area. Furthermore, this type of scanner does not acquire color information which must therefore be captured with a different device and manually combined later, therefore aligned, with the 3D information, which leads to an additional burdening of the production time but also causes an imperfect result because of the impossibility to obtain an identical point of view between the two digitization systems.

Alternatively to the Point-to-Point scanner, in the prior art there have been attempts of using the "Multi Stereo" technique in combination with a linear scanner also of color type. The "Multi Stereo" technique consists in capturing the surface to be digitized several times from different points of view and combining the resulting information through suitable "Multi Stereo" algorithms in order to obtain a 3D profile of the surface. This technique has known and intrinsic limitations and in particular: the resolution of the elevation, height and embossing information is limited by the acquisition resolution and the distance between the different points of view. Therefore, while digitizing large formats the resolution rarely exceed a millimeter, allowing for example to recognize the outline of a coin but not the fine details of the drawings on its surface; and the 3D map contains many errors generated by the 3D matching algorithm; this technique is based in fact on the ability to recognize pixels or groups of pixels within the different images and this involves errors due to the very high probability that in the same image pixels or groups of similar pixels are repeated, just as in a continuous surface with a regular pattern. One way to limit the recognition problem is to extend the search area to include very large groups of pixels but this also causes a proportional degradation of the effective resolution that, therefore, it is very often only a fraction of the original scan resolution. This is a known limit and the different implementations of the "Multi Stereo" algorithms are in fact dedicated to reduce this problem as much as possible. Therefore, the "Multi Stereo" technique is usable only on very small formats or when the level of resolution and detail required is low. Alternatively to the Point-to-Point scanner, attempts have also been made to use the "Structured Light" technique which however is not able to provide a sufficient level of resolution and detail even on small formats.

The use of linear laser sensors in place of point-to-point sensors for industrial reproduction for decorative purposes, while very popular for complete 3D scanning of three-dimensional objects, is not possible in the prior art due to the limits in the resolution of these sensors but also due to problems in the automatic stitching of the different strips.

The photometric stereo technique is the less known among the 3D reconstruction techniques and in fact the existing implementations based on it are rare, especially there are very rare commercial implementations. This technique requires realizing a complex lighting system and even more complex mathematical algorithms. Furthermore this technique does not allow to obtain an absolute 3D measure of the digitized object but only a relative scale and therefore, for example, it can not be used in measuring applications or for the reconstruction of complex objects. Therefore, in most commercial 3D applications "laser scanning with linear sensor", "Multi Stereo" and "Structured Light" techniques are very popular, where they allow to obtain limited results which are anyway adequate to the needs of these applications. Whereas instead, in the 3D industrial applications for decorative purposes, the Point-to-Point scanning technique is popular due to the fact that in the prior art there are no existing implementations of the photometric stereo technique capable of providing results on large originals and also at high resolution.

The photometric stereo technique allows to estimate a "normal map" of the surface of an object from a set of color or grayscale digital images of the same object and more in detail by repeating the digitization of the object each time enlightening it from a different direction.

The photometric stereo technique states that there is a mathematical relationship between the variations of light that can be measured comparing the various images acquired with different lighting directions and the orientation of the surface of the digitized object. In particular, by knowing the different enlightening directions, the incidence angles and the intensity of the light and the point of view position of the imaging sensor, it is possible to establish a mathematical relationship between the various digital images that allows to estimate the normal to the surface of the object of digitization.

With the photometric stereo technique it is also possible to obtain a sort of elevation model commonly called "depth map", for example through an integration process of the "normal map", but also directly depending on the algorithms used to implement the photometric stereo technique. Both the normal map and the depth map allow generating 3D representations of the digitized object. The photometric stereo technique, when applicable, allows obtaining a 3D map with a resolution level proportional to the imaging sensor resolution and is also able to resolve elevation details which are normally only obtainable with Point-to-Point laser systems. However, the photometric stereo technique has so far been implemented very rarely and almost exclusively in combination with matricial sensors and, therefore, with a resolution limited by the size of the sensor. Combining the photometric stereo technique to a high-resolution imaging sensor, such as in a linear scanner, would allow obtaining 3D detailed information even over large formats. But in the prior art there are still several unresolved problems that have not allowed to achieve an optimal implementation of this technique on a linear scanner.

In FIG. 1 exemplified in an axonometric view is a typical prior art embodiment of an image scanner based on a linear type imaging sensor 1 in which the digitization takes place through line after line acquisition of an object of digitization 5. In particular, the acquisition takes place by moving in the forward direction indicated by the arrow 7 a set formed by a imaging sensor 1, an optical system 2s, an optical axis 3, a lighting system comprising two first light sources 6a, 6b and a scan line 4 or, alternatively, moving a set formed by a scanning plane 8 and the object of digitization 5. Generally, the scan line 4 is a linear portion of the scanning plane 8 or the surface of the object of digitization 5 determined by the vision of the linear type imaging sensor 1 through the optical system 2s. The x, y and z axes define a Cartesian system in which the x axis, parallel to the forward direction indicated by the arrow 7, is coplanar to the scanning plane 8 and centered on the optical axis 3; the y axis, parallel to the scan line 4, is coplanar to the scanning plane 8 and centered on the optical axis 3 and the z axis corresponds precisely to the optical axis 3. This embodiment comprises two light sources 6a, 6b, in the claims called two first light sources, arranged symmetrically with respect to the vision plane defined by the scan line 4 and the optical axis 3, and centered on the x axis. Light source centered on the x axis means that the centerline of the light source is in a moving plane defined by the x axis and the y axis. This arrangement of the light sources 6a, 6b allows to radiate the scan line 4 with light beams incident perpendicularly on the scan line 4. This arrangement of the light sources 6a, 6b allows to uniformly radiate the entire scan line 4 from one side to the other and, for example, referring to the light source 6a, with uniform light intensity 9a and uniform incidence angles 10a of the light source over the entire length of the scan line 4. The light intensity 9a of the light source, for example 6a, is in the drawings schematically represented by the light beams emitted from the light source 6a and directed to the scan line 4. In this prior art arrangement, the distance traveled by the light beams emitted by the light source 6a and incident on the scan line 4 is uniform over the entire length of the scan line 4 with a result of determining the uniform light intensity 9a. The incident angles 10a of the light source 6a are determined from the set of angles with which the light beams emitted from the light source 6a are incident on the scan line 4; in addition, in this prior art embodiment the angles with which the light beams emitted by the light source 6a are incident on the scan line 4 are uniform over the entire length of the scan line 4 and this therefore determines uniform incident angles 10a of the light source 6a.

In FIG. 2 exemplified in an axonometric view is another prior art embodiment in which two light sources 6c, 6d, are arranged symmetrically with respect to said moving plane defined by the x axis and the y axis and centered on y axis. Light source centered on the y axis means that the centerline of the light source is located in the vision plane defined by the y axis and the z axis.

This arrangement of the light sources 6c, 6d does not allow to radiate the scan line 4 with light beams incident perpendicularly on the scan line 4. In the prior art this arrangement of the light sources 6c, 6d does not allow to radiate uniformly the entire scan line 4 from one side to the other and, in particular, does not allow a uniform light intensity 9c and uniform incident angles of the light sources 10c over the entire length of the scan line 4.

FIG. 2 represents an unusual embodiment and highlights the problems of non-uniformity of illumination typical of this lighting configuration. In particular, the problems consists in the fact that both the light intensity 9c, which depends primarily on the distance traveled by the light beams, and the incident angles 10c of the light source 6c are not uniform over the entire length of the scan line 4 due to the different distance and radiation angle.

FIG. 2 also highlights the non-uniformity problems of the optical point of view and, in particular, light beams 12s directed to the optical system 2s are not parallel to each other and also light beams 11s directed to the imaging sensor 1 are not parallel to each other. In fact, FIG. 2 highlights that the use of a standard optical system 2s involves that one side of the imaging sensor 1 perceives the original with a given inclination angle while the opposite side of sensor 1 even with a very different angle. The light beams 12s directed to the optical system 2s are the set of light beams, useful to the vision, which go from the scan line 4 to the optical system 2s. The light beams 11s directed to the imaging sensor 1 are the set of light beams, useful to the vision, which from the optical system 2s go to the imaging sensor 1. In particular, the light beams 12s directed to the optical system 2s have different incident angles 13s respect to the optical system 2s and the light beams 11s directed to the imaging sensor 1 have different incident angle 14s on the imaging sensor 1. The incident angles 13s respect to the optical system 2s are the set of angles with which the light beams directed to the optical system are incident on the scan line 4 respect to the optical system 2s. The incident angles 14s on the imaging sensor 1 are the set of angles with which the light beams directed to the imaging sensor 1 are incident on the imaging sensor 1 respect to the optical system 2s.

It is known that to obtain an optimal estimate of the normal to the surface according to the photometric stereo technique it is necessary to have a set of multiple images of the surface enlightened by corresponding multiple directions very different one from each other, the minimum value being generally regarded as a set of three images and the optimal one as a set of four images; it is also known that optimal results can be obtained only by using light sources with a radiation that can be easily mathematically defined and, consequently, optimal results can be obtained in practice only by using light sources with uniform radiation all over the surface of the object of digitization and, in particular, with uniform light intensity and uniform incident angles for each one of the different lighting directions. So essentially, it would require that at least two further light sources 6c, 6d, as described in FIG. 2, are added to the typical prior art embodiment of FIG. 1.

But this is insufficient because the photometric stereo technique states that it is possible to establish a mathematical relationship between the variations of light reflection on the original surface and the normal to the surface and it is therefore clear that if the intensity and the incident angles of light beams emitted by light sources 6c, 6d, are not uniform over the entire surface of the object to be digitized it is very difficult to establish a valid mathematical relationship and therefore obtain optimal results.

Precisely for the problems described above and in FIG. 2, in the very rare exceptions in which a prior art linear scanner also includes light sources of the 6c, 6d type, these are in any case unusable for the purposes of the photometric stereo technique as they do not provide uniform incident angles of the light source and uniform light intensity over the entire scan line 4. More generally, if in a prior art embodiment there are light sources like light sources 6c and 6d in FIG. 2, placed at the extremes of scan line 4, these light sources are not conceived to enlighten the scan line 4 independently from the main light sources 6a, 6b of FIG. 1, but instead serve to provide limited and localized light effects. In fact, light sources 6c and 6d of FIG. 2 do not allow to properly enlighten the scan line 4 even only for color scanning purposes and therefore independently from the photometric stereo technique.

Another prior art problem highlighted in FIG. 2 limits the ability to realize an optimal implementation of the photometric stereo technique on a linear scanner and concerns the difficulty of obtaining a uniform optical point of view over the entire scan line 4 with respect to the vision of the imaging sensor 1. In fact, traditional optical systems imply that light beams 12s directed to the optical system 2s and light beams 11s directed to the imaging sensor 1, coming from the scan line 4 and directed to the imaging sensor 1, are not parallel to each other and, in particular, have incident angles 13s with respect to the optical system 2s and incident angles 14s on the imaging sensor 1 that are all non-uniform. Similarly, to the problem of non-uniformity of the light sources 6c, 6d previously highlighted, a non-uniform optical point of view can strongly compromise the ability to obtain optimal results by using the photometric stereo technique. This happens because if the intensity and incident angles of the light beams directed to the imaging sensor are not uniform over the entire length of the object of digitization and, therefore, if the imaging sensor 1, through the optical system 2, detect differently the light beams 11s coming from the different portions of the scan line 4 it is evidently very difficult to establish a mathematical relationship between the variations of light on the surface of the original and the normal to the surface.

An application of the photometric stereo technique on a linear scanner is described in the patent application CN102798351. Given the lighting problem previously described, the patent application CN102798351 describes a desktop scanner in which the object of digitization is manually rotated four times with respect to the scanning plane and therefore with respect to the lighting system, the imaging sensor and the optical system. This allows four different images of the object of digitization to be obtained by using the optical system of a desktop scanner. However, the four resulting images must be aligned before calculating the 3D through the photometric stereo technique. The linear scanner of the patent application mentioned above has a single light source so as to enlighten the scan line from one side at a time. The problem of the patent application CN102798351 is exactly that the different points of view of the four acquisitions do not allow to obtain perfectly overlapping images, especially with object of digitization with high thickness, due to the vision through the optical system of the scanner, the repositioning and also to the unavoidable deformation of the object of digitization between a scan and the next one. Therefore, the patent application CN102798351 in addition to propose an inconvenient and complicated scanning method also fails in providing the ideal conditions to calculate detailed 3D information according to the photometric stereo technique. Furthermore, the patent application CN102798351 does not propose a solution to the optical and lighting problems described before but just a way to implement the photometric stereo technique on a prior art desktop image scanner.

Due to the fact that in the prior art Point-to-Point scanning is the only technique really usable for scanning 3D information of large format and high resolution originals, the need is felt for a scanner capable of contextually acquiring color and 3D information, especially with the requirements demanded by the industrial reproduction applications for decorative purposes. Furthermore, for the same reasons the need is felt for a scanner capable of providing perfectly aligned information of 3D and color because these information are today acquired at most using different devices but in most cases from different scanners and at different moments.

It would be also desirable a linear scanner that optimally integrates the photometric stereo technique and that is capable of solving the previously described problems among which the digitization of large format objects at high resolution as required by the industrial reproduction applications for decorative purposes.

DESCRIPTION OF THE INVENTION

In this context, the technical task at the basis of this invention is to propose an image scanner capable of digitizing three-dimensional surfaces according to the photometric stereo technique also capable of overcoming the prior art problems mentioned above.

A purpose of this invention is to provide an image scanner, based on a linear type imaging sensor, such as a linear, bilinear, trilinear, multilinear or similar sensor, capable of optimally implementing the photometric stereo technique and, therefore, capable of generating 3D information of elevation, height and embossing of the object of digitization by combining the information of different images of the object all acquired from the same point of view but varying the lighting direction within the different acquisitions.

Another purpose of this invention is to provide a scanner equipped with a lighting system that overcomes the non-uniformity lighting limits described above.

Another purpose of this invention is to provide a scanner equipped with a lighting system optimally arranged for the photometric stereo technique.

Another purpose of this invention is to provide a scanner equipped with an optical system that allows to overcome the optical limits previously described.

Another purpose of this invention is to provide a scanner capable of digitizing at the same time color or grayscale information and 3D information, all perfectly aligned as resulting essentially from the same scanning process.

Another purpose of this invention is to provide a scanner capable of digitizing large surfaces at very high definition overcoming the format and resolution limits caused by the physical dimension and pixel number of the imaging sensor and the limits of the optical system used.

According to a first aspect of the present invention the indicated technical task and the specified purposes are substantially achieved by a linear image scanner capable of digitizing three-dimensional surfaces according to photometric stereo technique including the technical features exposed in one or more of claims 1 to 7 herein. According to a second aspect of the present invention the indicated technical task and the specified purposes are substantially achieved by a scanning method that use a linear image scanner according to claims 1 to 7 including the technical features exposed in one or more of claims 8 and 9 herein.

BRIEF DESCRIPTION OF THE DRAWINGS

Further features and advantages of the present invention will become more obvious from the indicative, and therefore non-limiting description of embodiments of a linear image scanner capable of digitizing three-dimensional surfaces according to the photometric stereo technique as illustrated in the herein enclosed drawings in which.

DESCRIPTION OF THE EMBODIMENTS

Figure 1:
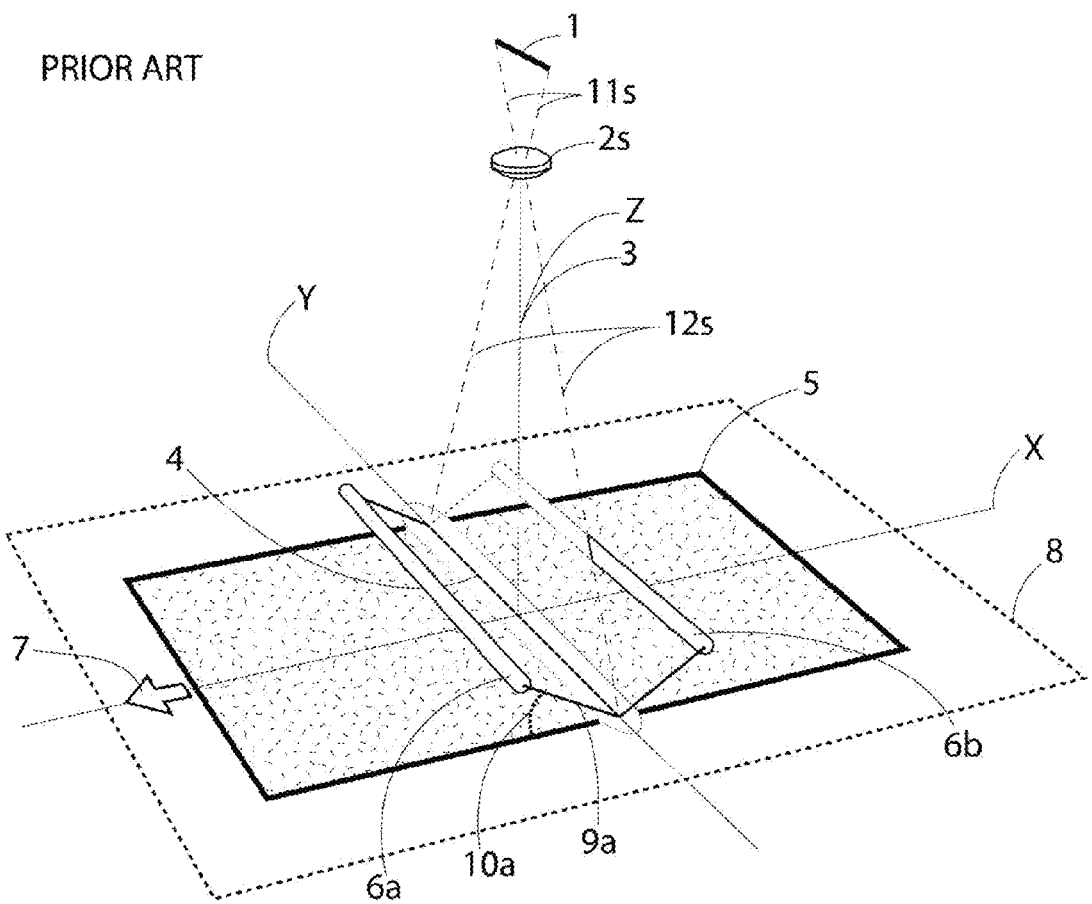
FIG. 1 is an axonometric view of a first typical prior art embodiment of an image scanner based on a linear type imaging sensor, in which the digitization takes place through line after line acquisition of an object of digitization.
Figure 2:
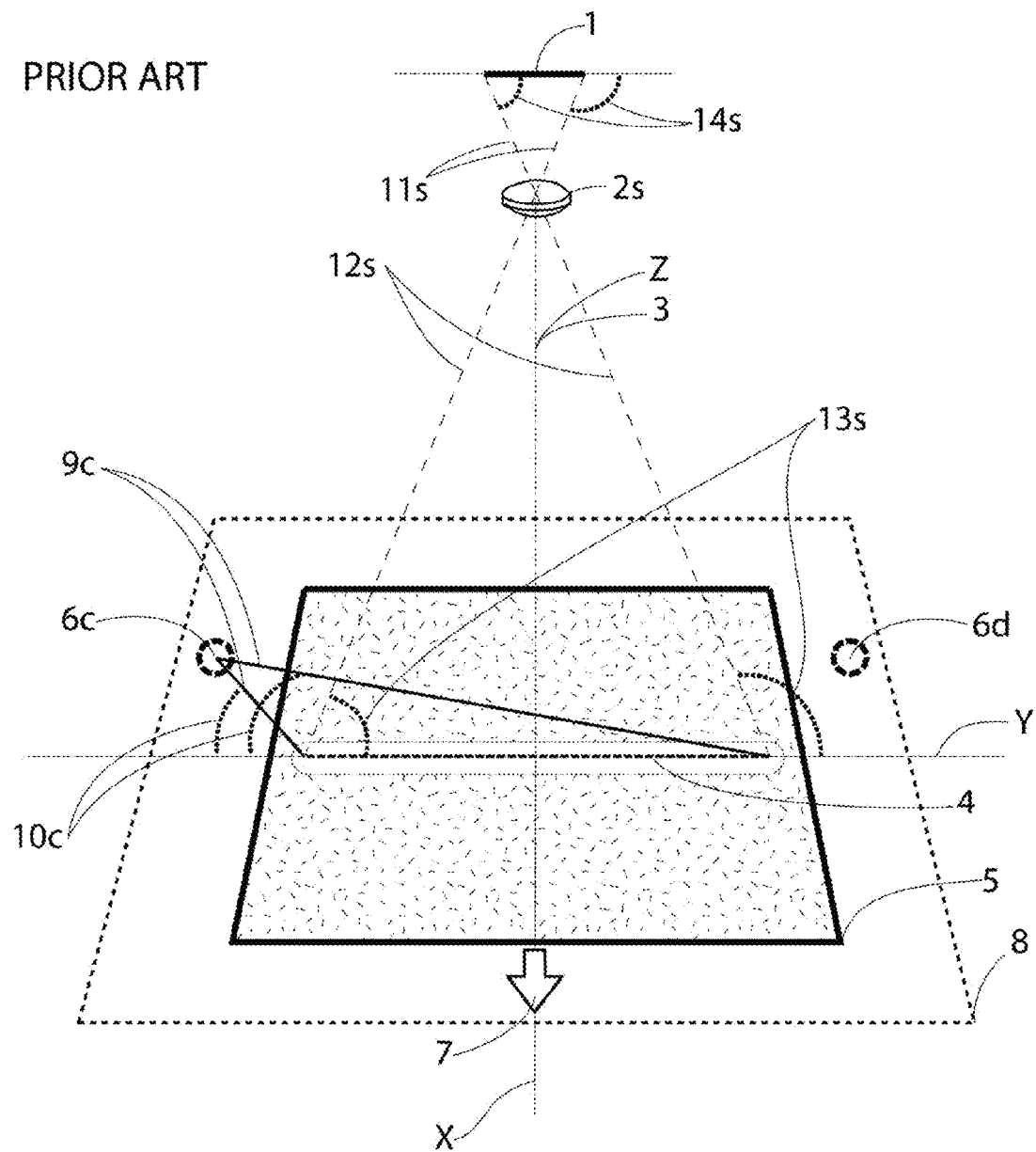
FIG. 2 is an axonometric view of a second prior art embodiment of an image scanner based on a linear type imaging sensor, in which two light sources are arranged symmetrically with respect to a moving plane.
Figure 3:
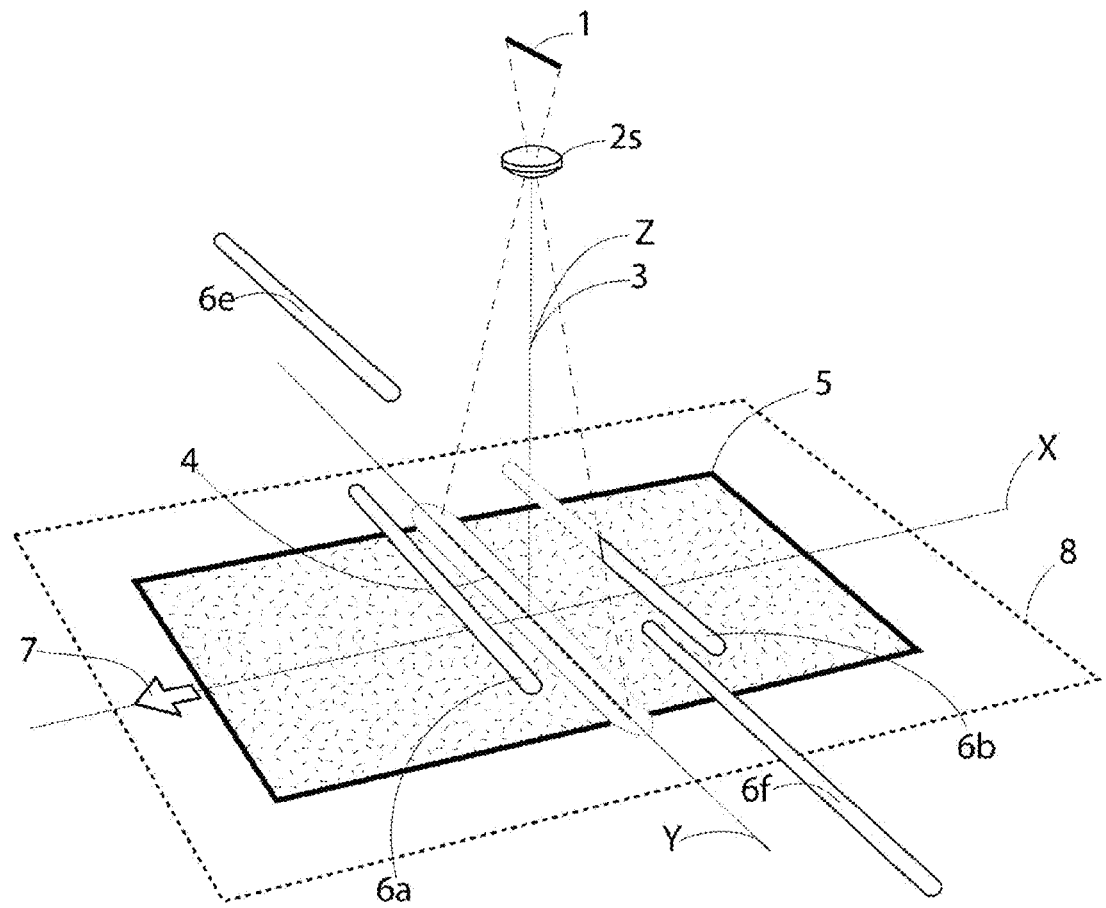
FIG. 3 is an axonometric view of a scanner according to a first embodiment of the present invention in which four light sources are highlighted.

In the following figures equal or similar reference numbers are used to indicate parts that are equal or similar to those of FIGS. 1 and 2 which represent the prior art. In FIG. 3 exemplified in an axonometric view is a first embodiment of the image scanner according to the present invention. In this embodiment, two light sources 6a, 6b are arranged symmetrically respect to the vision plane defined by y axis and z axis and centered on the x axis. Furthermore, two light sources 6e, 6f, are arranged symmetrically with respect to the moving plane defined by x axis and z axis and are centered on the y axis.

This first embodiment allows to optimally enlighten the object of digitization 5 by corresponding four directions very different one from the other and therefore providing one of the necessary conditions to obtain an optimal estimate of the normal to the surface of the object of digitization according to the principles of the photometric stereo technique.

Figure 4:
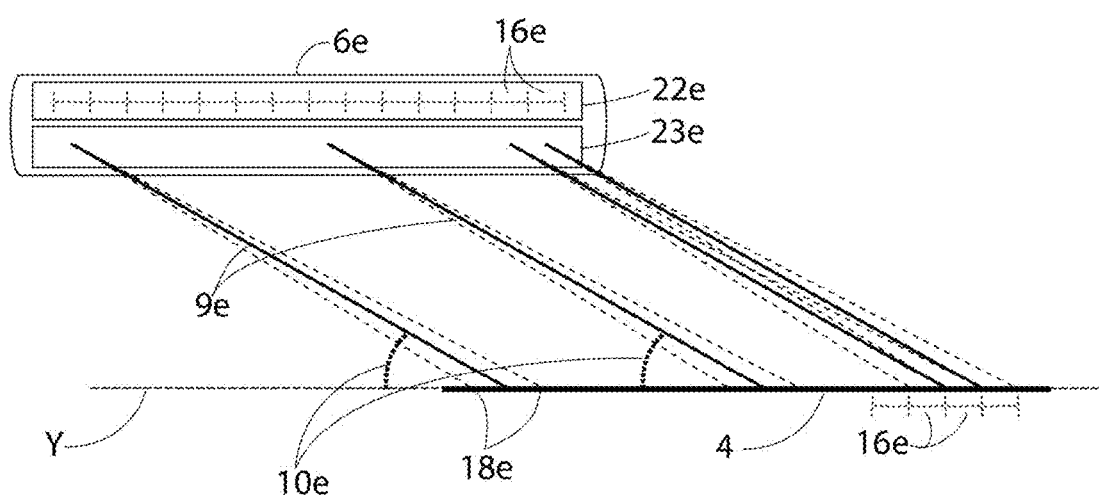
FIG. 4 is an enlarged and detailed side view of a light source according to the first embodiment of the present invention.

FIG. 4 is an enlarged and detailed side view of a light source 6e of FIG. 3. FIG. 3 and the detail of FIG. 4 show how the present invention intends to solve the problem, unsolved in the prior art, of enlightening uniformly the scan line 4 and, in particular, how to get from the light source 6e uniform light intensity 9e, schematically represented as a segment, and uniform incident angles 10e over the entire length of the scan line 4.

The incident angles 10e are the angles formed between the light intensity 9e and the scan line 4. The light source 6e is made of a linear illuminator 22e and an optical subsystem 23e associated to the linear illuminator 22e and capable of concentrating the light emission originated at regular intervals 16e of the linear illuminator 22e only on corresponding discrete and contiguous portion 18e of the scan line 4 at regular intervals 16e and to radiate the scan line 4 with uniform light intensity 9e and uniform incident angles 10e over the entire length of the scan line 4 so that light beams belonging to adjacent regular intervals 16e overlap to form a continuous luminous line.

Figure 5:
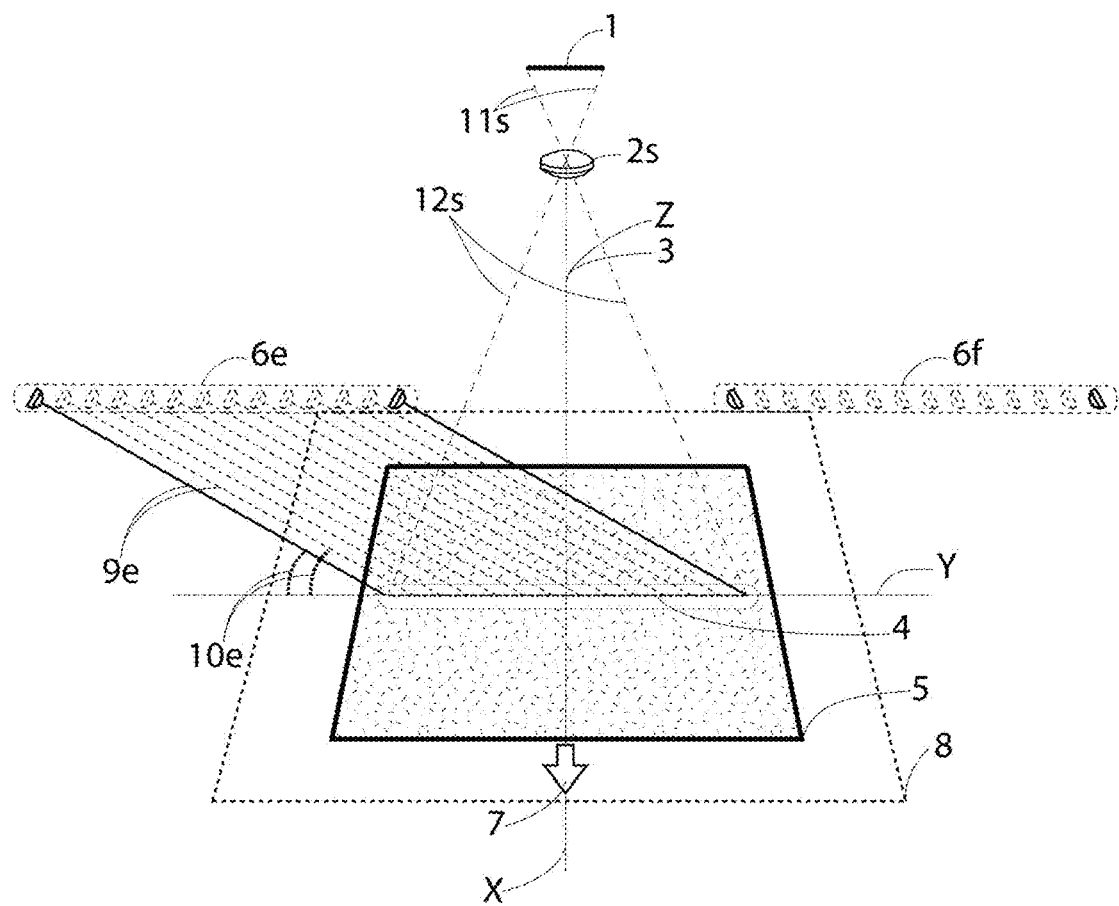
FIG. 5 is an axonometric view of the scanner embodiment in FIG. 3 in which only two light sources are represented schematically, for sake of clarity.

In FIG. 5 exemplified in an axonometric view is a different detail of the first embodiment of the image scanner according to the present invention. In this drawing the two light sources 6a, 6b have been omitted for sake of clarity while the light sources 6e, 6f have been further highlighted.

Figure 6:
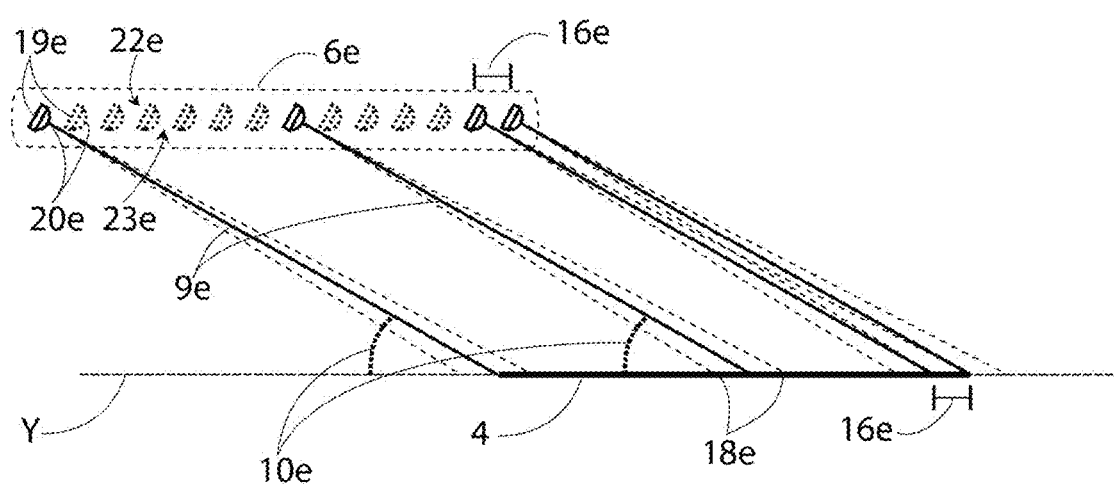
FIG. 6 is an enlarged and detailed side view of a light source of the scanner in FIG. 5.

FIG. 6 shows a further detail of the light source 6e of the first embodiment of the image scanner according to the present invention, from which it is clear that in this embodiment the linear illuminator 22e is constituted by an array of LEDs 19e and the optical subsystem 23e is constituted by an array of lenses 20e arranged each other at regular intervals 16e and such that the light beams of adjacent LEDs overlap to radiate the scan line 4 with an uniform light intensity 9e and uniform incident angles 10e over the entire length of the scan line 4; the amplitude and the modulation of the light beams emitted by the LEDs 19e on the corresponding discrete and contiguous portion 18e of the scan line 4 depend on the lens 20e type which should therefore be chosen so that the light beams of adjacent LEDs overlap to form a continuous luminous line.

Figure 7:
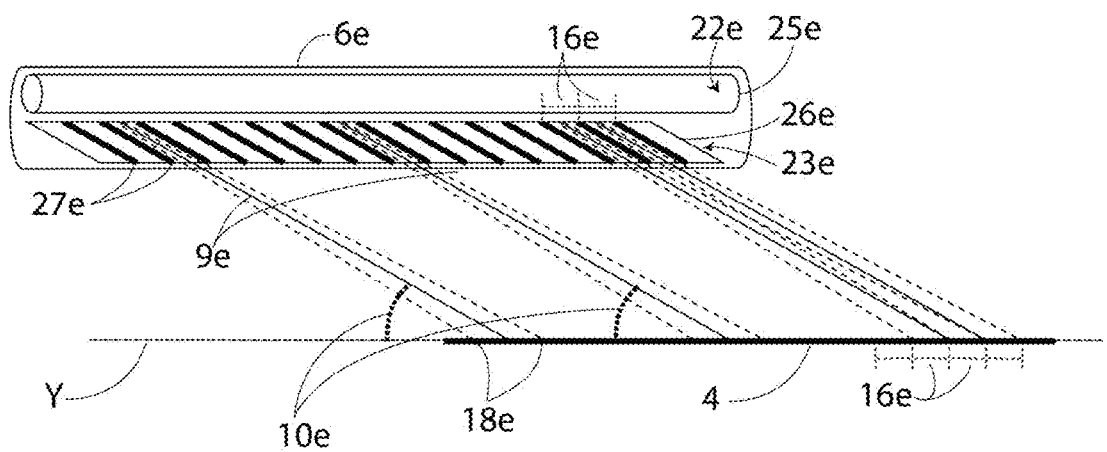
FIG. 7 shows an enlarged and detailed side view limited to a portion of one light source of a second embodiment of the present invention.

FIG. 7 shows a detail of the light source 6e in a second embodiment of the image scanner according to the present invention.

In this embodiment the linear illuminator 25e is constituted by a fluorescent lamp and the optical subsystem 23e is constituted by a light modeling grid 26e made of an array of fins 27e. The array of fins 27e have length, distance and orientation suitable for limiting the light emission angles only on corresponding discrete and contiguous portions 18e of the scan line 4 so that the light beams overlap to form a continuous luminous line with a uniform light intensity 9e and uniform incident angles 10e of the light source 6e over the entire length of the scan line 4.

A different embodiment not illustrated here of the image scanner according to the present invention and, in particular, of the lighting system includes, instead of the lenses 20e shown in FIG. 6, the use of a Fresnel lens designed to direct the light beams emitted from the array of LEDs or from a linear light source such as a fluorescent tube or a linear LED, in order to obtain an uniform lighting over the entire scan line 4.

A different embodiment of the image scanner according to the present invention not illustrated here, instead of using the Fresnel lens previously described, includes the use of an array of micro-lenses designed to direct the light beams emitted from the array of LEDs or a linear lamp such as a fluorescent tube or a linear LED in order to obtain an uniform lighting over the entire scan line 4.

The same solutions previously described to make uniform the light emission can also be implemented even when the light sources are positioned and oriented, with respect to the scan line 4, in a different manner, not shown in the drawings, from what has been shown in FIG. 3 and, in particular, when the light sources 6a and 6b are not centered on the x axis, or when the light sources 6e and 6f are not centered on the y axis.

Figure 8:
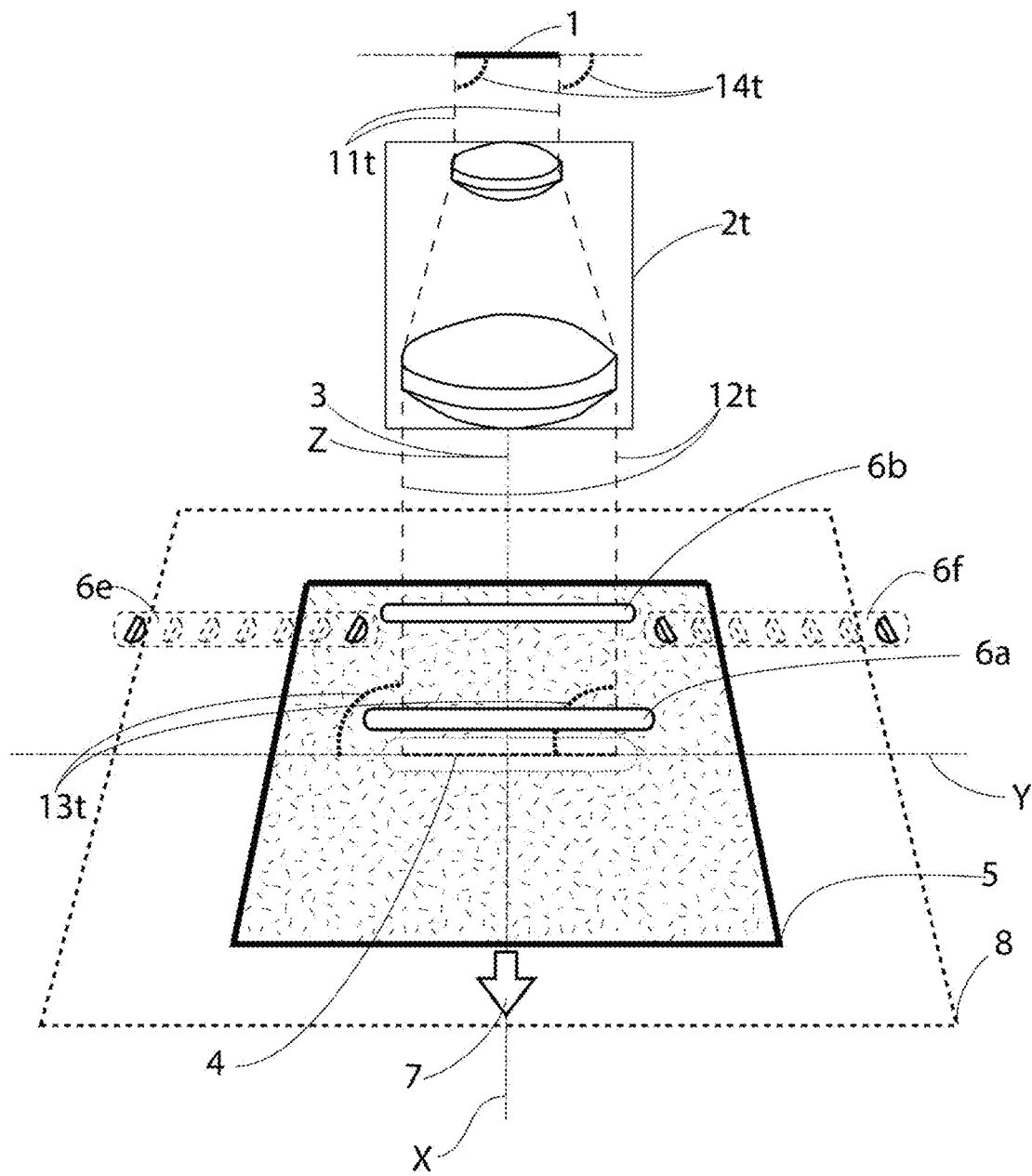
FIG. 8 is an axonometric view of a third embodiment of the image scanner according to the present invention.

In FIG. 8 exemplified in an axonometric view is a third preferred embodiment of the image scanner according to the present invention in which there is a lighting system with four light sources 6a, 6b, 6e, 6f, arranged according to the present invention, with a movement in the forward direction indicated by the arrow 7. This third embodiment of the image scanner according to the present invention use the lighting system described previously in the first embodiment but, instead of the standard optical system, use a telecentric lens 2t. Telecentric lens means a telecentric or bi-telecentric type optical system.

FIG. 8 shows a lighting system with four light sources 6a, 6b, 6e, 6f, arranged according to the present invention which is characterized by the lens 2t of telecentric type which is capable of providing a uniform point of view over the entire length of the imaging sensor 1.

Consequently, the light beams 12t directed to the optical system 2t and the light beams 11t directed to the imaging sensor 1 are parallel in entry and in exit from the optical system 2t and, therefore, have uniform incident angles 13t with respect to the optical system 2t and uniform incident angles 14t over the imaging sensor 1.

This third preferred embodiment of the image scanner according to the present invention solves the prior art problem of obtaining a uniform point of view of the scan line 4 over the imaging sensor 1, by providing one of the necessary conditions for an optimal estimate of the normal to the surface of the object of digitization 5 according to the principles of the photometric stereo technique.

Figure 9:
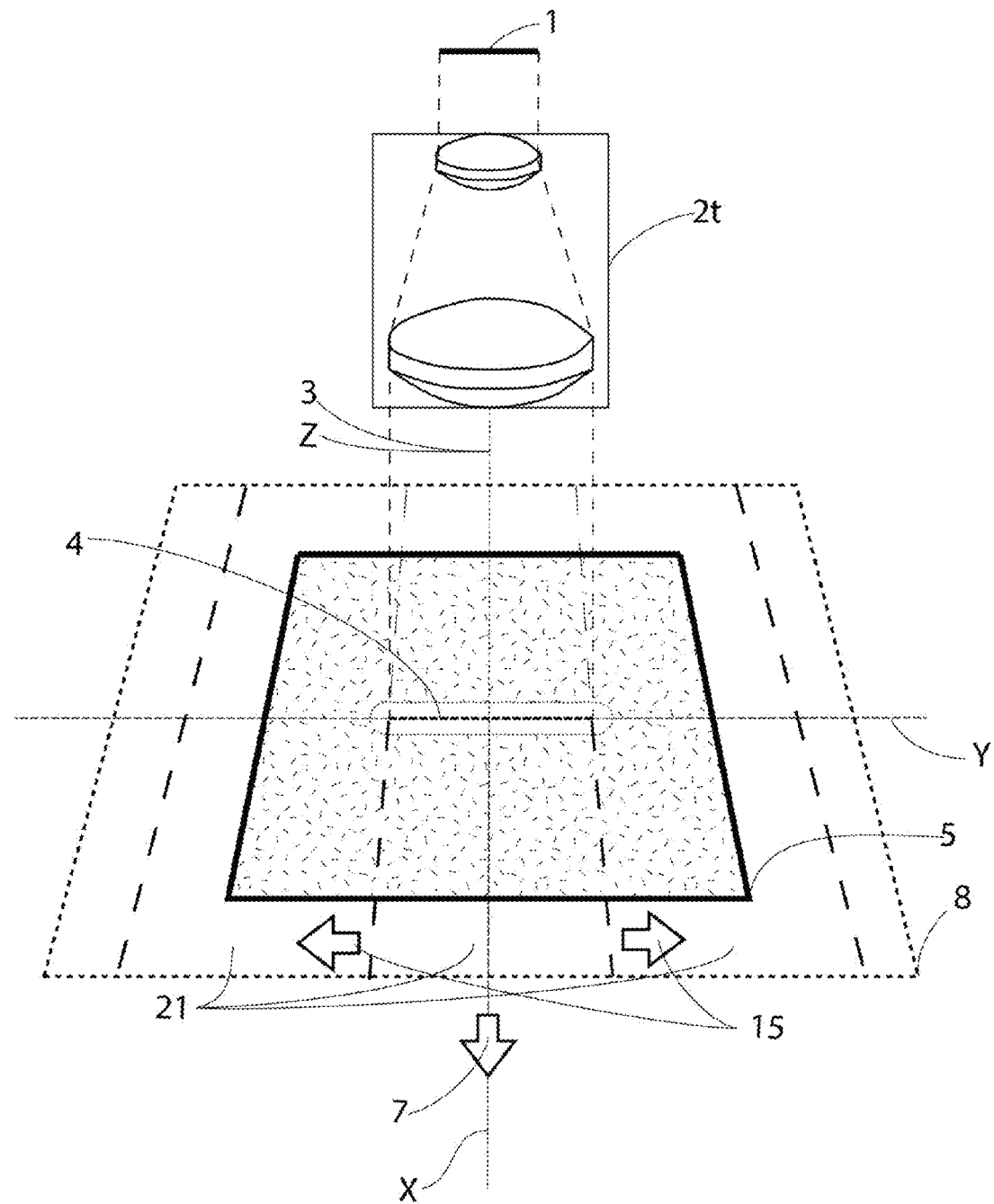
FIG. 9 is an axonometric view of a fourth embodiment of the image scanner, similar to the one in FIG. 8, but without the light sources, for sake of clarity.

A fourth preferred embodiment of the image scanner according to the present invention is described in FIG. 9 in which exemplified in an axonometric view is the image scanner in which is a telecentric lens 2t integrated, and in which in addition to the movement in the forward direction indicated by the arrow 7, added is also the movement in the direction indicated by the arrows 15 parallel to the scan line 4, of the set made by the scanning plane 8 and the object of digitization 5 or the set made of the imaging sensor 1, the optical system 2t, the optical axis 3, the scan line 4 and the lighting system 6a, 6b, 6e, 6f, not shown in the FIG. 9 but still present in this embodiment.

The movement in the direction indicated by the arrows 15 is orthogonal to the forward direction indicated by the arrow 7 and allows originals that exceed the physical dimension of the telecentric lens 2t to be acquired. In this case, the scanning method consists in repeating several times the acquisition in the forward direction indicated by the arrow 7 and, in particular, moving from one scan to the next one, the scan line 4 in the direction indicated by the arrows 15 in order to obtain different adjacent strips 21, with or without overlap, that once stitched by software form a unique image of the object of digitization 5. The use of telecentric lens 2t combined to a linear scanner equipped with a high precision and repeatability mechanical moving system, in the directions indicated by the arrows 7 and 15, guarantees the perfect stitching of the various strips 21 thanks to the uniform optical point of view over the entire length of the scan line 4. Furthermore, the use of a lighting system according to the present invention and, therefore, with uniform light emission on the scan line 4, as described in FIGS. 3, 4, 5, 6, 7, 8, also guarantees the perfect stitching of the images relating to both lighting intensity and color. Furthermore, this fourth embodiment allows to obtain a huge format and resolution image scanner in which the format and the maximum resolution of acquisition are no longer limited by the pixel formats of the imaging sensor 1 but by the mechanical movement in the directions indicated by arrows 7 and 15. In conclusion, this forth embodiment of the image scanner according to the present invention allows also to acquire at high resolution large format originals overcoming the limits imposed by the physical dimensions of the imaging sensor 1, and allowing also to solve acquisition size limits caused by the implementation of a telecentric lens and, more in detail, to solve acquisition size limits which are caused by the maximum size of the scan line 4 and by the physical dimension of the telecentric lens 2t.

All embodiments of the image scanner according to the present invention are based on the use of a linear type imaging sensor 1 and therefore also solve the prior art problem of obtaining color or grayscale information contextually to the three-dimensional information; in fact the three-dimensional information are calculated according to the photometric stereo technique exactly from the color or grayscale information provided by the imaging sensor 1.

Moreover, in all embodiments of the image scanner according to the present invention it is possible to implement multiple light sources.

The invention claimed is:

1. A linear image scanner comprising a linear type imaging sensor, a scanning plane on which an object of digitization is placed, an optical system, an optical axis coinciding with a z axis, a scan line contained in a y axis and determined by the vision of the linear type imaging sensor, through the optical system, of a linear portion of the scanning plane or a surface of the object of digitization, a lighting system comprising at least two first light sources, a vision plane defined by the scan line and the optical axis and a moving plane defined by a forward direction, coinciding with a x axis, and by the optical axis, and in which the two first light source are arranged symmetrically with respect to said vision plane, opposite one another, so as to radiate the scan line with light beams paralles to the moving plane, said light sources being independently controllable and arranged so that each light source enlighten the scan line from a different direction with a uniform light intensity and uniform incident angles of the light sources over the entire length of the scan line, wherein the lighting system includes also at least two second light sources independently controllable and arranged symmetrically respect to said moving plane, opposite one another, so as to radiate the scan line with light beams parallels to the vision plane, and in which each second light source is made of a linear illuminator and an optical subsystem associated to the linear illuminator and capable of concentrating light beams originated at regular intervals of the linear illuminator only on corresponding discrete and contiguous portions of the scan line at regular intervals and of radiating the scan line with uniform light intensity and uniform incident angles over the entire length of the scan line so that light beams belonging to adjacent regular intervals overlap to form a continuous luminous line.

2. The linear image scanner according to claim 1, wherein said linear illuminator belonging to the second light sources is constituted by choosing from a group including an array of LEDs, a linear lamp, a fluorescent tube and a linear LED.

3. A scanning method using the linear image scanner according to claim 2 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

4. The linear image scanner according to claim 2, wherein an optical system consists of a telecentric lens.

5. A scanning method using the linear image scanner according to claim 4 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

6. The linear image scanner according to claim 1, wherein said linear illuminator belonging to the second light sources is constituted by an array of LEDs and wherein said optical subsystem belonging to the second light sources is constituted by an array of lenses arranged at regular intervals so as that each LED have a corresponding lens aimed to focus the light emission only on a corresponding discrete and contiguous portion of the scan line, and each LED and corresponding lens being positioned at a uniform distance and uniform angle of emission with respect to said discrete and continuous portion of the scan line to be enlightened; each LED emitting in the corresponding discrete and continuous portion of the scan line a light beam having amplitude and modulation dependent on the type of lens and such that the light beams of adjacent LEDs overlap to form a continuous luminous line and so as to radiate the scan line with a uniform light intensity and uniform incident angles of the second light sources over the entire length of the scan line.

7. A scanning method using the linear image scanner according to claim 6 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

8. The linear image scanner according to claim 6, wherein an optical system consists of a telecentric lens.

9. The linear image scanner according to claim 1, wherein said optical subsystem belonging to the second light sources is constituted by a light modeling grid, made of an array of fins whose length, distance and orientation are suitable for limiting the light emission angles only on corresponding discrete and contiguous portions of the scan line so that the light beams overlap to form a continuous luminous line for radiating the scan line with a uniform light intensity and uniform incident angles of the second light sources over the entire length of the scan line.

10. A scanning method using the linear image scanner according to claim 9 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

11. The linear image scanner according to claim 9, wherein an optical system consists of a telecentric lens.

12. The linear image scanner according to claim 1, wherein an optical system consists of a telecentric lens.

13. The linear image scanner according to claim 12 wherein the scanner is provided with mutual movement, in a direction parallel to the scan line, of the scanning plane and the set including the linear type imaging sensor, the optical system and the lighting system, so as to scan the object of digitization in different strips that can be stitched.

14. A scanning method using the linear image scanner according to claim 13 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

15. A scanning method using the linear image scanner according to claim 12 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

16. The linear image scanner according to claim 1, wherein said optical subsystem belonging to the second light sources is constituted by a lens aimed to limit the light emission angles only on discrete and contiguous portions of the scan line so that the light beams overlap to form a continuous luminous line and for radiating the scan line with a uniform light intensity and uniform incident angles of the second light sources over the entire length of the scan line.

17. The linear image scanner according to claim 16, wherein an optical system consists of a telecentric lens.

18. A scanning method using the linear image scanner according to claim 16 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

19. A scanning method using the linear image scanner according to claim 1 wherein at least four different images of the object of digitization are obtained by activating each time a different light source including the at least two first light sources and the at least two second light sources and in a manner that each image represents the same portion of the object of digitization, always acquired from the same point of view but with different enlightening directions, in order to obtain a 3D reconstruction of the surface of the object of digitization by estimating the normals to the surface obtained by calculating the variations in the amount of reflected light between the at least four different images and therefore by estimating the surface orientation as a function of said variations and the known position, direction and angle of the different light sources and the point of view of the imaging sensor.

20. The scanning method according to claim 19, wherein information of color or grayscale and three-dimensional information are obtained by scanning the object of digitization.

\* \* \* \* \*